United States Patent
Hallundbæk et al.

(10) Patent No.: US 9,726,005 B2
(45) Date of Patent: Aug. 8, 2017

(54) POSITIONING METHOD AND TOOL FOR DETERMINING THE POSITION OF THE TOOL IN A CASING DOWNHOLE

(75) Inventors: Jørgen Hallundbæk, Græsted (DK); Mathias Francke, Virum (DK)

(73) Assignee: WELLTEC A/S, Allerød (DK)

( * ) Notice: Subject to any disclaimer, the term of this patent is extended or adjusted under 35 U.S.C. 154(b) by 582 days.

(21) Appl. No.: 14/131,750

(22) PCT Filed: Jul. 11, 2012

(86) PCT No.: PCT/EP2012/063534
§ 371 (c)(1),
(2), (4) Date: Jan. 9, 2014

(87) PCT Pub. No.: WO2013/007739
PCT Pub. Date: Jan. 17, 2013

(65) Prior Publication Data
US 2014/0152298 A1    Jun. 5, 2014

(30) Foreign Application Priority Data
Jul. 11, 2011   (EP) .................................... 11173403

(51) Int. Cl.
*G01V 3/12*   (2006.01)
*G01R 33/02*  (2006.01)
(Continued)

(52) U.S. Cl.
CPC .......... *E21B 47/0905* (2013.01); *G01B 7/003* (2013.01); *G01V 3/26* (2013.01)

(58) Field of Classification Search
CPC . G01V 3/00; G01V 3/08; G01V 3/081; G01V 3/087; G01V 3/26; E21B 47/02;
(Continued)

(56) References Cited

U.S. PATENT DOCUMENTS 2,717,039 A * 9/1955 Gieske ................ E21B 47/0905
166/63
2,967,994 A * 1/1961 Peterson ............. E21B 47/0905
324/221
(Continued)

FOREIGN PATENT DOCUMENTS

EP    2 317 071        5/2011
FR    2914007 A1 *   9/2008   ......... E21B 47/0905
(Continued)

OTHER PUBLICATIONS

Notification Concerning Transmittal of International Preliminary Report on Patentability and Written Opinion for corresponding PCT Application No. PCT/EP2012/063534, issued Jan. 14, 2014, 7 pages.
(Continued)

*Primary Examiner* — Reena Aurora
(74) *Attorney, Agent, or Firm* — Nixon & Vanderhye PC (57) ABSTRACT

The invention relates to a positioning method for determining a position of a downhole tool moving at a velocity in a casing in a well, comprising the steps of measuring a magnitude and/or direction of a magnetic field by means of a first sensor several times over a time period while moving along a first part of the casing manufactured from metal, determining a manufacturing pattern of the casing along the first part from the measurement measuring a magnitude and/or direction of a magnetic field by means of the first sensor several times over a time period while moving along a second part of the casing manufactured from metal, determining the velocity of the tool along the second part, adjusting the determined velocity of the tool along the second part based upon the manufacturing pattern.

16 Claims, 3 Drawing Sheets

(51) Int. Cl.
*E21B 47/09* (2012.01)
*G01B 7/00* (2006.01)
*G01V 3/26* (2006.01)

(58) Field of Classification Search
CPC .... E21B 47/09; E21B 47/022; E21B 47/0905; E21B 47/02216; G01N 27/72; G01B 7/14; G01B 7/30; G01B 7/003; G01R 33/02
USPC ................................. 324/333, 338, 207.13
See application file for complete search history.

(56) References Cited

U.S. PATENT DOCUMENTS

| | | | | | |
|---|---|---|---|---|---|
| 3,015,063 | A | * | 12/1961 | Ownby | G01N 27/9093 310/DIG. 3 |
| 3,434,046 | A | * | 3/1969 | Lorenzino, Jr. | E21B 47/0905 324/221 |
| 3,570,594 | A | * | 3/1971 | Hamilton | G01N 27/82 166/64 |
| 3,843,923 | A | * | 10/1974 | deVries | E21B 41/0014 166/66 |
| 4,110,688 | A | * | 8/1978 | Bailey | E21B 19/20 166/66.5 |
| 4,292,589 | A | * | 9/1981 | Bonner | E21B 47/082 324/221 |
| 4,540,941 | A | * | 9/1985 | Walkow | E21B 17/1021 166/241.5 |
| 4,808,925 | A | | 2/1989 | Baird | |
| 5,279,366 | A | * | 1/1994 | Scholes | E21B 43/119 166/254.2 |
| 6,411,084 | B1 | * | 6/2002 | Yoo | G01V 3/26 166/255.1 |
| 6,768,299 | B2 | * | 7/2004 | Almaguer | G01V 3/26 324/220 |
| 7,347,261 | B2 | * | 3/2008 | Markel | E21B 47/0905 166/255.1 |
| 7,990,138 | B2 | * | 8/2011 | Martin | E21B 47/0905 324/221 |
| 8,134,360 | B2 | * | 3/2012 | Dutta | G01B 7/10 324/220 |
| 2002/0145423 | A1 | | 10/2002 | Yoo | |
| 2005/0194132 | A1 | | 9/2005 | Dudley et al. | |
| 2006/0173626 | A1 | * | 8/2006 | McElhinney | E21B 47/0905 702/9 |
| 2008/0089175 | A1 | * | 4/2008 | Miszewski | E21B 47/09 367/35 |
| 2008/0150521 | A1 | * | 6/2008 | Meeten | G01N 27/72 324/221 |
| 2008/0236819 | A1 | * | 10/2008 | Foster | E21B 33/12 166/255.2 |
| 2009/0084546 | A1 | * | 4/2009 | Ekseth | E21B 47/04 166/255.1 |
| 2009/0165548 | A1 | * | 7/2009 | Pop | E21B 49/008 73/152.51 |
| 2009/0166035 | A1 | * | 7/2009 | Almaguer | E21B 7/061 166/254.1 |
| 2009/0250213 | A1 | * | 10/2009 | Kalb | G01R 33/0322 166/255.1 |
| 2009/0281764 | A1 | * | 11/2009 | Raykhman | G01B 7/023 702/150 |
| 2012/0217009 | A1 | * | 8/2012 | Hallundbæk | E21B 47/0905 166/255.2 |
| 2013/0056202 | A1 | * | 3/2013 | Maida | E21B 47/123 166/255.1 |
| 2013/0249705 | A1 | * | 9/2013 | Sharp | E21B 47/123 340/854.7 |

FOREIGN PATENT DOCUMENTS

| | | | | |
|---|---|---|---|---|
| FR | WO 2008139070 A1 | * | 11/2008 | ......... E21B 47/0905 |
| GB | WO 9213174 A1 | * | 8/1992 | ........... E21B 47/024 |
| GB | 2 310 042 | | 8/1997 | |
| GB | 2 317 071 | | 5/2011 | |
| RU | 2298646 | | 5/2007 | |
| RU | 2405105 | | 11/2010 | |
| WO | WO 02/099250 A1 | | 12/2002 | |
| WO | WO 03/087536 | | 10/2003 | |
| WO | WO 2007112363 A2 | * | 10/2007 | ............. E21B 17/00 |
| WO | WO 2009/158189 A2 | | 12/2009 | |
| WO | WO 2011/051429 A1 | | 5/2011 | |

OTHER PUBLICATIONS

International Search Report for PCT/EP2012/063534, mailed Sep. 3, 2012.
Chinese Office Action mailed Feb. 3, 2016 in Chinese Application No. 2012800342506 with English translation (14 pages).
Russian Decision to Grant for Application No. 2014103875/03(006077) and its English translation, mailed Oct. 7, 2016 (18 pages).

* cited by examiner

Fig. 3C time [s]

POSITIONING METHOD AND TOOL FOR DETERMINING THE POSITION OF THE TOOL IN A CASING DOWNHOLE

This application is the U.S. national phase of International Application No. PCT/EP2012/063534, filed 11 Jul. 2012, which designated the U.S. and claims priority to EP Application No. 11173403.4, filed 11 Jul. 2011, the entire contents of each of which are hereby incorporated by reference.

TECHNICAL FIELD

The present invention relates to a positioning method for determining the position of a tool in a casing downhole.

BACKGROUND

When running a tool in a casing downhole, it may often be desirable to know the specific position of the tool. Especially when running different types of inspection or logging tools, it may be very important to know the exact location of each observation made during the inspection or logging. For this and several other reasons, many attempts have been made to develop a device capable of determining the position of the tool when situated downhole.

A known device for determining the position of a tool downhole is called a "Casing collar locator". Typically, a locator comprises one or more magnets and one or more coils for measuring changes in the magnetic and electrical flux when passing a collar or casing feature significant enough to cause a measurable change. The device is thus only able to determine the position of the tool collar by collar and not between two collars, and in order to measure differences in the flux, the device must be moved with considerable speed in the casing.

Another "Casing collar locator" comprises one or more flux gate magnetometers in the form of coils for measuring the remaining or naturally occurring magnetism in the casing collars. However, in order to determine the position of the tool between the collars, the wireline depth must be used.

As shown in U.S. Pat. No. 6,768,299, a "Casing collar locator" may also comprise one magnetometer for measuring changes in the strength of the magnetic field generated from a magnet. The "Casing collar locator" may also comprise more than one magnetometer to achieve different modes of detection so that one magnetometer detects collars and the other magnetometers detect the direction of the tool in order to control the direction of the drilling head of the tool.

SUMMARY OF THE INVENTION

It is an object of the present invention to wholly or partly overcome the above disadvantages and drawbacks of the prior art. More specifically, it is an object to provide an improved method capable of determining an exact position of the tool.

The above objects, together with numerous other objects, advantages, and features, which will become evident from the below description, are accomplished by a solution in accordance with the present invention by a positioning method for determining a position of a downhole tool moving in a casing in a well, comprising the steps of:
measuring a magnitude and/or direction of a magnetic field several times over a time period by means of a first sensor comprised in the downhole tool, while moving along a first part of the casing,
determining a manufacturing pattern of the first part of the casing based on the measurement, and
determining a position of the downhole tool by comparing a reference manufacturing pattern of the first part of the casing with the determined manufacturing pattern of the first part of the casing.

Furthermore, the position of the downhole tool may be determined from a point of reference, such as a casing collar.

The positioning method may further comprise the steps of:
determining a reference manufacturing pattern by measuring a magnitude and/or direction of a magnetic field several times over a time period by means of a first sensor comprised in the downhole tool, while moving along a first part of the casing of a known length,
estimating a wave length of the reference manufacturing pattern based on the number of waves of the reference manufacturing pattern and the known length of the first part of the casing having been measured, and
counting the number of waves passing as the downhole tool moves along the first part of the casing, starting from a point of reference,
wherein the position of the downhole tool is determined continuously with respect to the point of reference as the downhole tool moves along the first part of the casing, based on the number of waves counted and the estimated wave length.

Moreover, the positioning method may comprise the steps of:
measuring a magnitude and/or direction of a magnetic field several times over a time period by means of a second sensor comprised in the downhole tool, while moving along the first part of the casing, the second sensor being arranged in the downhole tool with an axial distance to the first sensor, and
determining the velocity of the downhole tool along the first part of the casing from a measured time period between the first sensor measuring a first point of the casing and the second sensor measuring the same first point of the casing.

Furthermore, the positioning method may comprise the step of determining the velocity of the downhole tool along the first part of the casing by comparing the measurements from the first sensor with the measurements from the second sensor in order to calculate a velocity of the tool.

Additionally, the positioning method may comprise the steps of:
measuring a magnitude and/or direction of a magnetic field several times over a time period by means of the first sensor, while moving along a second part of the casing,
determining a manufacturing pattern of the second part of the casing based on the measurement,
determining the velocity of the downhole tool along the second part of the casing from a measured time period between the first sensor measuring a first point of the casing and the second sensor measuring the same first point of the casing, and
comparing the manufacturing pattern of the first part of the casing and the manufacturing pattern of the second part of the casing to determine the position of the downhole tool to be able to adjust the determined velocity of the tool along the second part based on the manufacturing pattern.

Furthermore, the manufacturing pattern of the first part of the casing and the manufacturing pattern of the second part of the casing may be compared by comparing distinct marks of the to different manufacturing patterns to determine the position of the downhole tool.

In addition, the casing may be made from metal.

The present invention furthermore relates to a positioning method for determining a position of a downhole tool moving at a velocity in a casing in a well, comprising the steps of:
measuring a magnitude and/or direction of a magnetic field by means of a first sensor several times over a time period while moving along a first part of the casing manufactured from metal,
determining a manufacturing pattern of the casing along the first part from the measurement,
measuring a magnitude and/or direction of a magnetic field by means of the first sensor several times over a time period while moving along a second part of the casing manufactured from metal,
determining the velocity of the tool along the second part, and
adjusting the determined velocity of the tool along the second part based upon the manufacturing pattern.

The step of determining a manufacturing pattern may comprise determining a cycle in the measurement coming when manufacturing the casing, such as forming the casing by means of rolling, cold drawing, rolling milling.

Furthermore, the manufacturing pattern may be barrel or rolling lines in the casing.

In an embodiment, the casing may be connected by means of casing collars and the first part and second part of the casing may be arranged between two collars.

Moreover, the first part of the casing may comprise several casing sections connected by collars.

Further, the manufacturing pattern may be thickness variations in the casing.

Additionally, the variation in the thickness of the casing may result from using a non-circular roller when manufacturing the casing by rolling.

The manufacturing pattern may result from a rolling process, mill rolling, cold drawing or hot drawing.

In addition, the sensors may be arranged in a detecting unit arranged in a tool and comprising two magnets and two sensors arranged with an axial distance from each other and in a same plane, such as on a plate.

Also, the manufacturing pattern may be a distance between a local minimum or maximum thickness of the casing and a next local minimum or maximum thickness of the casing.

Furthermore, the first sensor may have an axial distance to a second sensor and the step of determining the velocity is from a measured time period between the first sensor measuring a first point of the casing and the second detector measuring the same first point of the casing.

Additionally, the variation of the thickness of the casing may result from a non-circular roller used when manufacturing the casing by rolling.

The manufacturing pattern may be several fractions identified along the first part of the casing.

Moreover, the method according to the present invention may comprise the steps of:
measuring the magnitude and/or direction of the magnetic field by means of the second sensor, and
comparing the measurements from the first sensor with the measurements from the second sensor in order to calculate a velocity of the tool.

Said step of measuring the magnitude and/or direction of the magnetic field may be performed several times over a time period, and the step of comparing the measurements from the sensor may be performed after this time period.

The present invention also relates to a system for carrying out the method as described above, comprising:
a detecting unit comprising two magnets and two sets of sensors arranged with an axial distance from each other and in a same plane, such as on a plate.

By comprising two sets of sensors arranged with an axial distance from each other, the positioning tool is able to estimate the exact position of the tool by counting the number of waves of the manufacturing pattern and by continuously calculating the velocity of the tool based on the manufacturing pattern. Hereby, the positioning tool uses multiple methods to increase the accuracy of the position determination.

Also, the present invention relates to use of the method described above for accurately displaying a condition downhole in real time.

Finally, the present invention relates to use of the method as described above for accurately displaying a position downhole in real time.

By accurately is meant that the displaying of the condition is more accurate than if carried out by means of a casing collar locator.

BRIEF DESCRIPTION OF THE DRAWINGS

The invention and its many advantages will be described in more detail below with reference to the accompanying schematic drawings, which for the purpose of illustration show some non-limiting embodiments and in which FIG. 2 shows a positioning tool, FIG. 3A show another sequence of measurements obtained by a sensor.

All these figures are highly schematic and not necessarily to scale, and they show only those parts which are necessary in order to elucidate the invention, other parts being omitted or merely suggested.

DETAILED DESCRIPTION OF THE INVENTION

The present invention relates to a positioning method for determining a position of a downhole tool moving at a velocity in a casing in a well, also between two casing collars. When a downhole tool conducts certain measurements of the well properties, such as the well flow, fluid characteristics, temperature, the pressure etc., the measurements are each conducted at a certain time and position along the casing. However, if the position is not accurate due to the fact that the tool moves at another velocity than expected, the measurements provide an inaccurate picture of the well properties. When using present positioning tools, such as a casing collar locator, the position is adjusted when the positioning tool passes a casing collar and the distance since passing the previous casing collar is adjusted accordingly. However, such adjustments presume that the tool velocity has been constant between the previous and the present casing collar, and this may not always be the case.

When this happens, the measured well properties do not provide an accurate picture of the well.

Figure 1A:
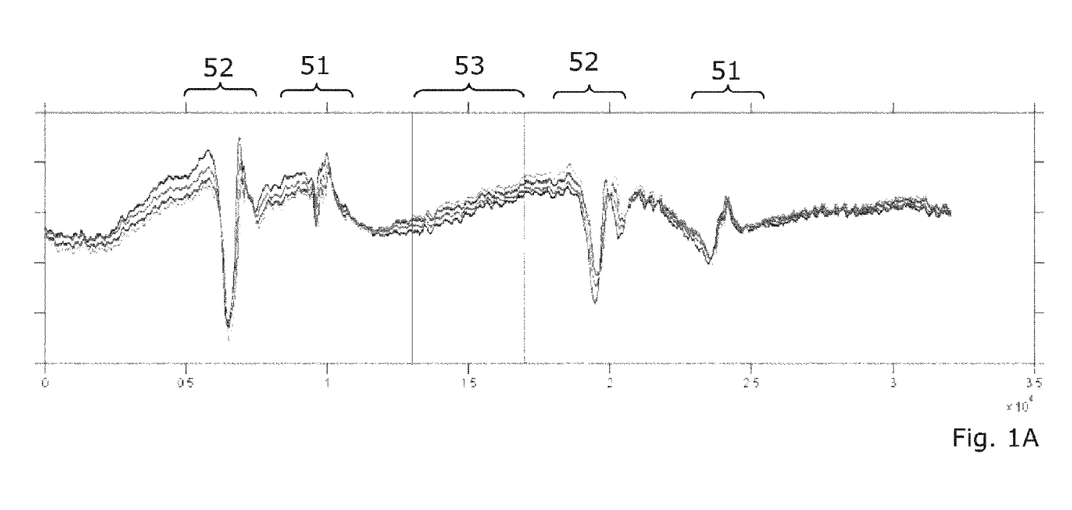
FIG. 1A shows a sequence of measurements by a sensor.
Figure 1B:
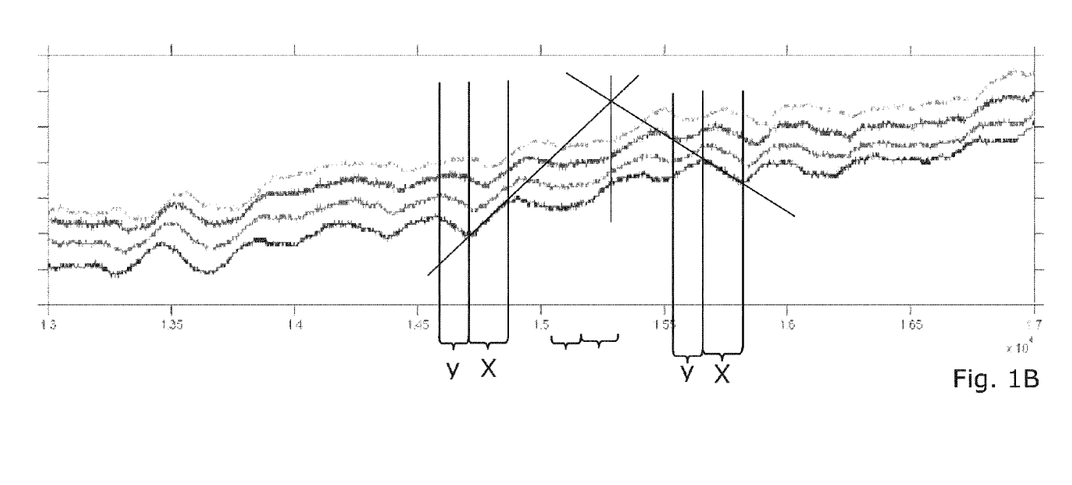
FIG. 1B shows an enlarged view of part of the sequence shown in FIG. 1A.
Figure 2:
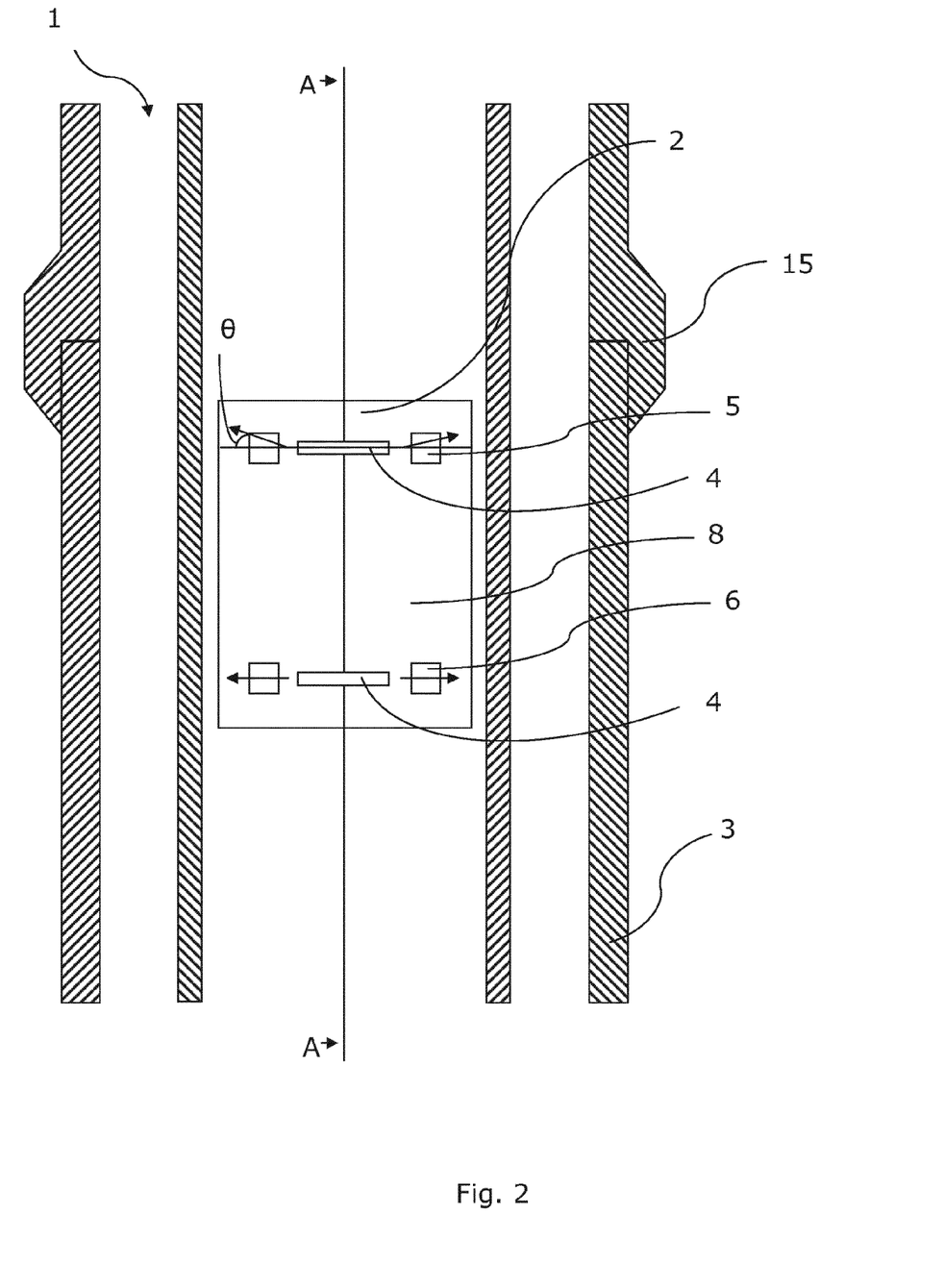

Using a positioning method according to the present invention, a magnitude and/or direction of a magnetic field is measured several times over a time period by means of a first sensor while moving along a first part of the casing manufactured from metal, as shown in FIGS. 1A and 1B. The sensor is arranged in a positioning tool 1 comprising a detection unit 2, as shown in FIG. 2. The detection unit 2 comprises two magnets 4 and two sets of r sensors 5, 6. These sensors 5, 6 are positioned so that one sensor is positioned on each side of the magnet 4. The two sets of sensors 5, 6 are arranged with an axial distance $d_2$ from each other and in the same plane 7, such as on a plate 8.

The positioning tool 1 has a substantially cylindrical shape, and the detecting unit 2 is arranged in its centre, extending along the length the tool. The plate 8 is fastened to the wall of the tool 1. When the tool 1 moves down the casing 3, the magnetic field changes depending on the surroundings, and the sensors 5, 6 detect the direction θ of the magnetic field lines when the tool moves. By performing substantially continuous measurements of the direction and/or magnitude, small variations are measured while the tool 1 passes the part of the casing 3 between two collars or joints, as shown in FIG. 1B. The small variations in thickness result from the manufacturing process, i.e. when the casing is made by means of rolling, resulting in barrel lines or rolling lines in the casing. The measurements come from small inaccuracies in the diameter of the roller and results in a manufacturing pattern, shown in FIG. 1B, having peaks in the form of local minimums and maximums.

Each sensor 5, 6 measures the same changes, but there is a difference in time between the measurements due to the distance between the sensors. The data from the sensors 5, 6 is convoluted, and from the maximum value of the convolution, it can be deducted when a sensor 5 of the first set of sensors passes the same position as a second sensor 6 of the second set of sensors, and so forth. The period between the point in time when the first and the second sensor pass the same positions is named ΔT, and since the distance $d_2$ between the first sensor 5 and the second sensor 6 is known, it is possible to calculate the velocity of the positioning tool 1 by means of the following equation:

$$v_{estimate} = \frac{d_2}{\Delta T}$$

The estimate of the velocity is based on a number of measurements, and by continuously calculating the velocity of the tool 1, it is possible to calculate the distance Δx travelled since the previous calculation by means of the following equation:

Δx=v·Δt where Δt is the time between calculations and Δx is the estimated velocity. When adding these estimated distances, the distance from the top of the well at a specific time of e.g. an observation of an irregularity, such as a leak, is known.

Using convolution between datasets received from at least two sensors instead of only comparing the measurements from one sensor with measurements from the other measurement by measurement, the method is relatively insensitive to noise in the measurements. In this way, a more accurate result is obtained. Furthermore, since the same characteristics are present in the two sets, the scale of the data is not important.

When the tool 1 passes a joint or collar where two casing parts are mounted together, the change in field direction is substantially increased. At this point, the distance from a collar is zero, and any errors in the estimated position of the tool can be eliminated. The number of past collars and the distance from the last collar indicate the determined position of the tool since the distance between collars is known. However, as mentioned, this determined position is based on the presumption that the tool moves at a constant velocity between two collars.

FIG. 1A shows a sequence of measurements conducted by means of a sensor moving past two casing collars. Unfortunately, the sequence of measurements shows the supports made of metal supporting the casing while testing, see the parts of the measurements marked 51, and thus, the manufacturing pattern is thus only visible at a distance from the supports and the collars. The part of the sequence of measurements conducted when the positioning tool passes a casing collar is marked 52. Thus, the sequence of measurements showing the manufacturing pattern is marked 53 and is showed in an enlarged view in FIG. 1B.

In FIG. 1B, a pattern is identified as e.g. two distances X and Y which occur at a certain point along the first casing part, and subsequently, this pattern is used to adjust the velocity and thus the position of the tool between two collars. When moving down the well, the positioning tool passes many casing parts between two collars, and thus, the manufacturing pattern is identified when the positioning tool passing these first parts. The identified manufacturing pattern of the first casing part may also be referred to as a reference manufacturing pattern. The pattern may have a constant thickness change so that at a certain part of the casing, a distance X between a local minimum or maximum thickness of the casing and a next local minimum or maximum thickness of the casing is identified. Such constant thickness variation may result from a non-circular diameter of the rollers used when manufacturing the casing by means of rolling. Subsequently, when the positioning tool passes a second casing part, another manufacturing pattern is identified, and any variations in relation to the first identified manufacturing pattern or the reference manufacturing pattern is used to adjust the velocity of the tool and thus correct the position at which a certain measurement of a well property is conducted.

In another case, the manufacturing pattern is a more unique pattern since no constant thickness change is identified. However, a pattern identified as the same from one casing part to the next when moving down the well also provides distinct marks along a second casing part at which the determined velocity and position of the tool can be adjusted by comparing the measured sequence of the second part of the casing with the identified manufacturing pattern. The velocity and position of the tool can thus be more accurately determined than would have been the case if carried out by means of a traditional casing collar locator since the tool velocity determination is not only based on a sequence of measurements, but also on a comparison of an expected and identified manufacturing pattern. Subsequently, the position of a measured well property can be more precisely determined.

The identified manufacturing pattern may only be fractions of the measurements illustrating thickness variations of a casing part, and thus, the pattern does not need to be identified along an entire casing part between two casing collars. By having identifiable manufacturing pattern fractions along a casing part, these may be used to adjust the determined velocity and position of the tool when measuring a sequence of a magnitude and/or direction of a magnetic field by means of a sensor while moving along a second part of the casing. When having e.g. two identified manufacturing pattern fractions along a casing part, the velocity and position determined from the sequence of the magnitude and/or direction of a magnetic field is adjusted twice along the second part and thus twice before reaching the next collar.

When producing the casing by means of rollers, the thickness of the casing varies in a certain pattern which is identified and stored in the positioning tool as the expected pattern and compared to the determined velocity. If the expected pattern does not correspond to the measured pattern for determining the velocity of the tool, the distance variations of the measured pattern in relation to the expected pattern is determined and the measured pattern is adjusted accordingly, and the velocity is recalculated or adjusted accordingly.

If the identified manufacturing pattern is a constant distance X between e.g. a local maximum thickness of the casing and a next local maximum thickness of the casing along the entire casing part between two casing collars, the tool velocity may be adjusted based on the time elapsed between measuring a local maximum thickness of the casing and a next local maximum thickness of the casing.

The detecting unit 2 of FIG. 2 only has four sensors 5, 6, and it is necessary to have two of the sensors arranged on the same side of the magnets 4 to calculate the position of the tool. The closer the two sensors 5, 6 are arranged in the longitudinal direction of the tool, the faster the measurements can be processed. One magnet 4 can be arranged on the outside of a sensor 5, 6 so that the first magnet is arranged on the outside of the first sensor and the second magnet is arranged on the outside of the second sensor. When a magnet 4 is arranged on the outside of each sensor 5, 6, all sensors are positioned with the same distance to the magnet, which results in a more precise measurement, again resulting in a better velocity estimates.

Thus, the positioning tool may comprise a first sensor 5 and a second sensor 6, wherein the velocity is determined by measuring the magnitude and/or direction of the magnetic field by means of the first sensor and subsequently the second sensor, and then comparing the measurements from the first sensor with the measurements from the second sensor in order to calculate a velocity of the tool.

Figure 3A:
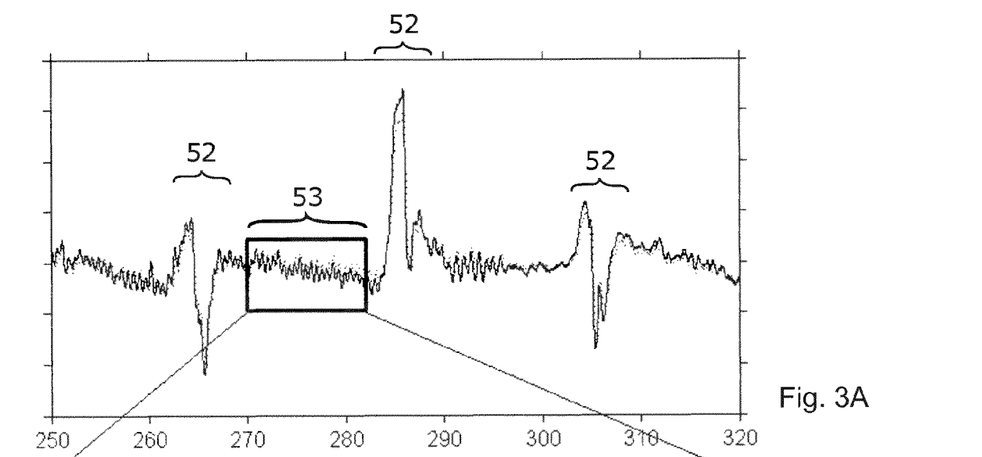
Figure 3B:
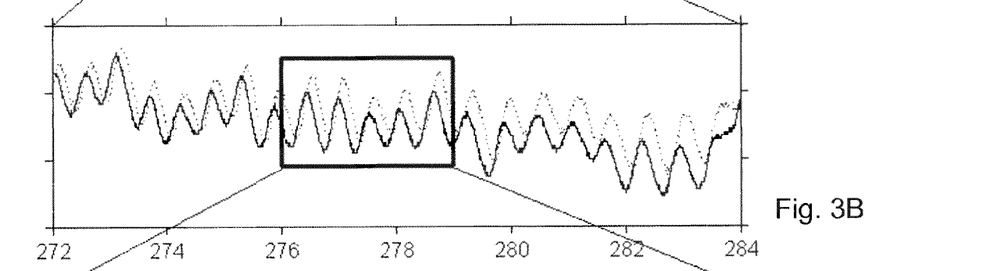
FIGS. 3B-3C show enlargements of a part of the sequence shown in FIG. 3A.
Figure 3C:
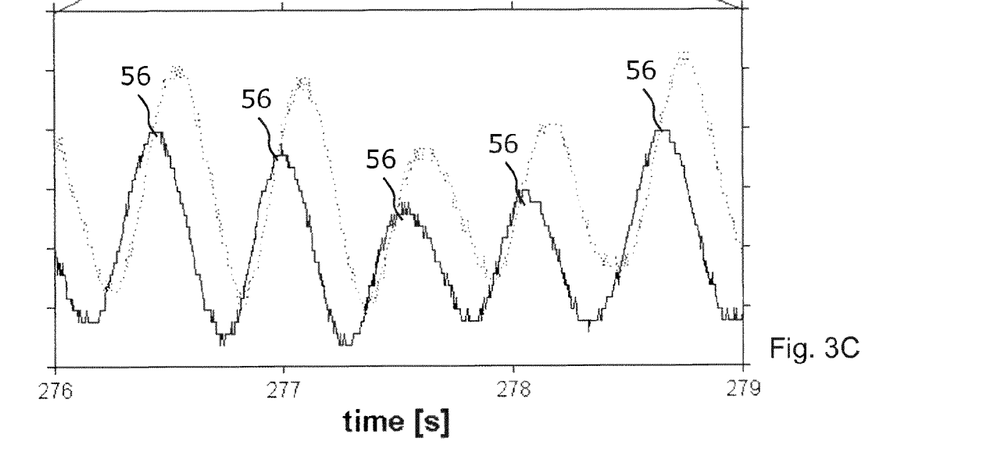

In another positioning method according to the present invention, the manufacturing pattern measured while moving along the casing is utilised in a slightly different way. FIGS. 3A-3C show sequences of measurement obtained by a sensor in a positioning tool having been run through a section of casing. The positioning tool may be a positioning tool such as that described above. The measurements show a manufacturing pattern representing characteristics of the casing, such as material characteristics as discussed above. The section of the casing having been scanned in this specific example represents a length of approximately 70 feet. The measurements shown in FIG. 3A reveal three obvious features 52 which represent casing collars present in the scanned section of the casing. In FIG. 3B and FIG. 3C, a section of the measurements shown in FIG. 3A is cut out and gradually enlarged. The representation of the measurement shows that the manufacturing pattern resembles a substantial periodic wave having peaks in the form of local minimums and maximums, as described above.

The enlargement of the sequence of measurements shown in FIG. 3C represents a length of a casing of approximately 3 feet and shows approximately 5 wave tops 56. Knowing the approximate length of the casing and the number of waves, the wave length is estimated to approximately 7 inches in this specific example.

In a similar manner, the casing in an existing wellbore may be scanned, whereby a reference manufacturing pattern is obtained. If the length of the scanned section of casing downhole is known, the wave length of the reference manufacturing pattern of the particular section of casing can be estimated based on the identified number of waves. The length of a scanned section of casing may be known or estimated if for example the section of the casing arranged between two casing collars or other points of reference is scanned.

Subsequently, information about the wave length obtained from the reference manufacturing pattern may be compared with another manufacturing pattern of the same section of the casing determined through a subsequent run wherein the casing is scanned. Knowing the wave length of the reference manufacturing pattern of the section of the casing, the position downhole may be determined by counting the number of waves identified as the positioning tool moves forward along the previously scanned section of the casing Methods for counting the number of wave are well known to the skilled person and may be conducted in an automated manner.

In theory, the number of waves may be counted from the top of the well to determine the position downhole. However, factors such as variations in the manufacturing pattern of different sections of the casing or inaccuracies in the identification of the number of wave may result in an undesirable inaccuracy in the position determined. In practice, the number of wave may advantageously be counted from a point of reference of a known position downhole. Such a point of reference may be represented by a specific feature present downhole, such as a casing collar, a valve, a nipple or a pop joint.

In one exemplary use, the method described above may be used for positioning a downhole tool at a specific position along a section of a casing. The downhole tool is moved through the well, e.g. using a downhole tractor, until a predetermined point of reference is reached. Then, the positioning tool is activated and the manufacturing pattern is determined, as described above. Depending on whether the specific section of the casing has been scanned or logged before and whether a reference manufacturing pattern exists, the specific position may be identified by simply counting the number of waves as the downhole tool moves through the casing or by first determining a reference manufacturing pattern and then counting the number of waves from the point of reference. A reference manufacturing pattern for estimating the wave length may be determined for a specific casing element prior to inserting the casing element into the well, in an earlier run after the casing has been installed or just prior to starting position estimation. Alternatively, a reference manufacturing pattern may be determined for all casing elements individually, e.g. for a casing from a specific manufacture, for casing elements from a specific batch, etc.

The manufacturing pattern and the related variations in the magnetic filed detected by the sensors may also result from material properties of the casing material or other manufacturing processes such as mill rolling, cold drawing or hot drawing.

By fluid or well fluid is meant any type of fluid that may be present in oil or gas wells, such as natural gas, oil, oil mud, crude oil, water etc. By gas is meant any type of gas composition present in a well, completion or open hole, and by oil is meant any type of oil composition, such as crude oil, an oil-containing fluid etc. Gas, oil and water fluids may therefore all comprise other elements or substances than gas, oil and/or water, respectively. The fluid may also be a combination of gas, oil, water and small solids in the fluid.

By a casing is meant all types of pipes, tubings, tubulars etc. used downhole in relation to oil or natural gas production.

In the event that the tools are not submergible all the way into the casing, a downhole tractor can be used to push the tools all the way into position in the well. A downhole tractor is any type of driving tool capable of pushing or pulling tools in a well, such as a Well Tractor®.

Although the invention has been described in the above in connection with preferred embodiments of the invention, it will be evident for a person skilled in the art that several modifications are conceivable without departing from the invention as defined by the following claims.

The invention claimed is:

1. A positioning method for determining a position of a downhole tool moving in a casing in a well, wherein the casing is connected by means of casing collars and a first part of the casing is arranged between two collars, comprising the steps of:
    using a first sensor comprised in the downhole tool to measure a magnitude and/or direction of a magnetic field several times over a time period, while moving along the first part of the casing,
    determining a manufacturing pattern of the first part of the casing based on the measurement, and
    determining a position of the downhole tool by comparing a predetermined reference manufacturing pattern of the first part of the casing with the determined manufacturing pattern of the first part of the casing.

2. A positioning method according to claim 1, further comprising the steps of:
    determining a reference manufacturing pattern by measuring a magnitude and/or direction of a magnetic field several times over a time period by means of the first sensor comprised in the downhole tool, while moving along the first part of the casing of a known length,
    estimating a wave length of the reference manufacturing pattern based on the number of waves of the reference manufacturing pattern and the known length of the first part of the casing having been measured, and
    counting the number of waves passing as the downhole tool moves along the first part of the casing, starting from the point of reference,
    wherein the position of the downhole tool is determined continuously with respect to the point of reference as the downhole tool moves along the first part of the casing, based on the number of waves counted and the estimated wave length.

3. A positioning method according to claim 1, further comprising the steps of:
    measuring a magnitude and/or direction of a magnetic field several times over a time period by means of a second sensor comprised in the downhole tool, while moving along the first part of the casing, the second sensor being arranged in the downhole tool with an axial distance to the first sensor, and
    determining the velocity of the downhole tool along the first part of the casing from a measured time period between the first sensor measuring a first point of the casing and the second sensor measuring the same first point of the casing.

4. A positioning method according to claim 3, further comprising the steps of:
    measuring a magnitude and/or direction of a magnetic field several times over a time period by means of the first sensor, while moving along a second part of the casing,
    determining a manufacturing pattern of the second part of the casing based on the measurement,
    determining the velocity of the downhole tool along the second part of the casing from a measured time period between the first sensor measuring a first point of the casing and the second sensor measuring the same first point of the casing, and
    comparing the manufacturing pattern of the first part of the casing and the manufacturing pattern of the second part of the casing to determine the position of the downhole tool to be able to adjust the determined velocity of the tool along the second part based on the manufacturing pattern.

5. A positioning method according to claim 1, wherein the determined manufacturing pattern results from thickness variations in the casing.

6. A positioning method according to claim 1, wherein the determined manufacturing pattern results from a rolling process, mill rolling, cold drawing or hot drawing.

7. A positioning method according to claim 1, wherein the determined manufacturing pattern results from a distance between a local minimum or maximum thickness of the casing and a next local minimum or maximum thickness of the casing.

8. A positioning method according to claim 1, wherein the first sensor is arranged in a detecting unit arranged in a tool and comprises two magnets and two sensors arranged with an axial distance from each other and in a same plane.

9. A positioning method according to claim 1, wherein the manufacturing pattern is several manufacturing pattern fractions identified along part of the casing.

10. A positioning method according to claim 1, wherein the first part of the casing comprises several casing sections connected by collars.

11. A positioning tool for carrying out the method according to claim 1, comprising:
    a detecting unit comprising two magnets and two sets of sensors arranged with an axial distance from each other and in a same plane.

12. A positioning tool comprising a detection unit being configured to carrying out the method according to claim 1.

13. Use of the method according to claim 1 for determining a position of a downhole tool.

14. A positioning system comprising a downhole tool including a sensor and a processing system, the processing system being configured to:
    control the downhole tool to move along a casing in a well connected by means of casing collars;
    while moving the downhole tool along a first part of the casing arranged between two casing collars, measure, based on data received from the sensor, a magnitude and/or direction of a magnetic field several times over a time period;
    determine a manufacturing pattern of the first part of the casing based on the measurement, and
    determine a position of the downhole tool in the casing by comparing a predetermined reference manufacturing pattern of the first part of the casing with the determined manufacturing pattern of the first part of the casing.

15. The positioning system of claim 14, wherein the sensor includes two magnets and two sensors arranged with an axial distance from each other and in a same plane.

16. The positioning system of claim 14, wherein the processing system is further configured to:
- determine and store in the positioning tool a reference manufacturing pattern by measuring a magnitude and/or direction of a magnetic field several times over a time period by means of the sensor, while moving along the first part of the casing of a known length from a point of reference in the casing,
- estimate a wave length of the reference manufacturing pattern based on the number of waves of the reference manufacturing pattern and the known length of the first part of the casing having been measured, and
- count the number of waves passing as the downhole tool moves along the first part of the casing, starting from the point of reference,
- wherein the position of the downhole tool is determined continuously with respect to the point of reference as the downhole tool moves along the first part of the casing, based on the number of waves counted and the estimated wave length.

* * * * *